United States Patent [19]

Robinson

[11] Patent Number: 4,956,090

[45] Date of Patent: Sep. 11, 1990

[54] HYDROCYCLONE DIVIDED INTO SECTIONS

[75] Inventor: William Robinson, Täby, Sweden

[73] Assignee: Richard Berg Aktiebolag, Taby, Sweden

[21] Appl. No.: 338,970

[22] Filed: Apr. 14, 1989

[30] Foreign Application Priority Data

Apr. 29, 1988 [SE] Sweden ................................ 8801635

[51] Int. Cl.[5] ........................ B01D 17/038; B04C 5/08

[52] U.S. Cl. ................................ 210/512.1; 55/459.1; 209/211

[58] Field of Search ............................ 55/459.1–459.5, 55/460; 209/144, 211; 210/512.1–512.3, 788

[56] References Cited

U.S. PATENT DOCUMENTS

| | | | |
|---|---|---|---|
| 2,338,779 | 1/1944 | Mutch | 210/512.1 X |
| 2,341,671 | 2/1944 | ter Linden | 55/459.1 |
| 2,639,006 | 5/1953 | Golwynne | 55/459.1 |
| 2,824,335 | 2/1958 | Moffat | 55/459.1 X |
| 3,235,091 | 2/1966 | Doll et al. | 209/211 X |
| 3,237,777 | 3/1966 | Brown et al. | 210/512.2 |
| 3,308,609 | 3/1967 | McCulloch et al. | 55/459.1 X |
| 3,331,193 | 7/1967 | Woodruff | 55/459.1 X |
| 3,370,408 | 2/1968 | Lehrer et al. | 55/459.4 X |
| 3,421,622 | 1/1969 | Wurtmann | 209/211 |
| 3,543,931 | 12/1970 | Rastatter | 210/512.2 X |
| 3,778,984 | 12/1973 | Lawser | 55/459.1 X |
| 3,862,041 | 1/1975 | Robinson | 210/512.2 |
| 3,925,044 | 12/1975 | Tu et al. | 55/459.2 X |
| 3,959,150 | 5/1976 | Frykhult et al. | 210/512.2 |
| 4,090,956 | 5/1978 | Benzon | 209/211 |
| 4,146,469 | 3/1979 | Kaiser et al. | 210/512.2 X |
| 4,148,721 | 4/1979 | Brown et al. | 210/512.2 X |
| 4,541,934 | 9/1985 | Hakola | 210/512.1 X |
| 4,572,787 | 2/1986 | Robinson | 210/512.2 |
| 4,623,458 | 11/1986 | Hakola | 210/512.1 X |

FOREIGN PATENT DOCUMENTS

| | | | |
|---|---|---|---|
| 1126665 | 6/1982 | Canada | 210/512.1 |
| 2024885 | 12/1971 | Fed. Rep. of Germany | 210/512.1 |
| 2654811 | 6/1978 | Fed. Rep. of Germany . | |
| 3007819 | 9/1980 | Fed. Rep. of Germany | 210/512.1 |
| 1207731 | 2/1960 | France | 210/512.1 |
| 98710 | 4/1940 | Sweden . | |
| 604587 | 4/1978 | U.S.S.R. . | |
| 895519 | 1/1982 | U.S.S.R. . | |
| 1024111 | 6/1983 | U.S.S.R. . | |

OTHER PUBLICATIONS

Front sheet of French Patent No. 2 389 418 (1978) (equivalent to U.S. Pat. No. 4,148,721, already of record).

Swedish Published Patent Document No. 7802042-7 (1979) (6 pages).

*Primary Examiner*—Robert Spitzer

*Attorney, Agent, or Firm*—Flynn, Thiel, Boutell & Tanis

[57] ABSTRACT

The invention relates to those hydrocyclones, which, for instance due to their length, do not lend themselves to manufacture in a single piece but are divided up into sections, which until now have been connected to one another usually with the help of flanged joints. In accordance with the invention it is proposed that the sections (52, 58, 60, 62) of a cyclone (50) be executed in such a way that the end of a section (e.g. 58) fits internally into the following section (60) in the direction of the flow and projects for a small distance into it, with the joint being sealed, if necessary, by a gasket. The sections are held securely together by a previously disclosed eccentric lock (70) of the folding strap type, at least two of which are arranged at each joint. Cyclones constructed in accordance with the invention can be imparted with curved form in order to facilitate, for example, their arrangement in batteries, and in those cases in which permanently connected cyclones are preferred, the sections can be welded together without the risk of crack formation, thanks to the fact that the arrangement in accordance with the invention produces fillet joints between the sections.

5 Claims, 3 Drawing Sheets

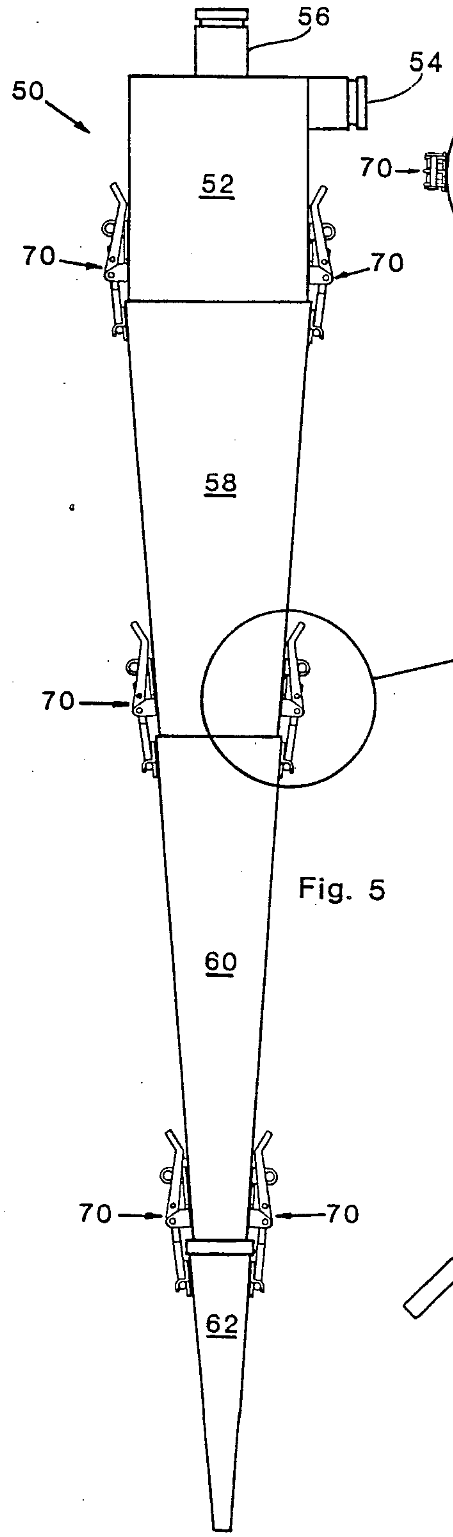
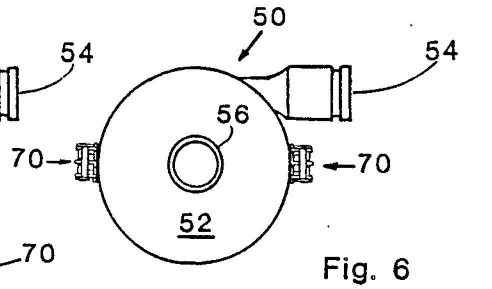
Fig. 6
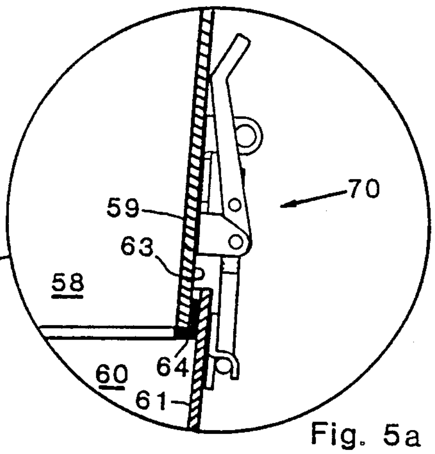
Fig. 5a
Fig. 5
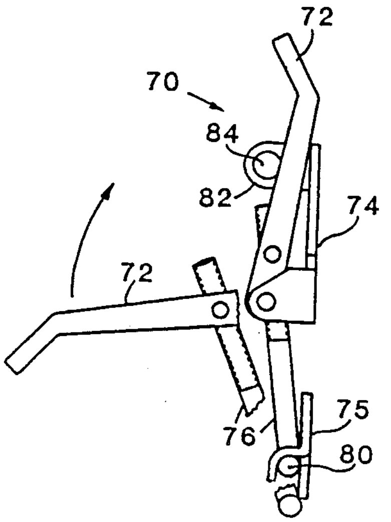
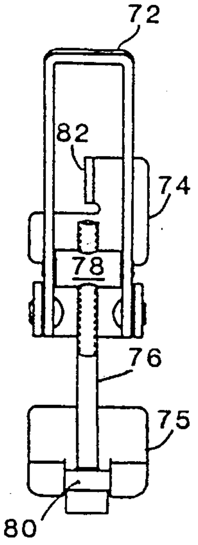
Fig. 7
Fig. 8

HYDROCYCLONE DIVIDED INTO SECTIONS

The present invention relates to hydrocyclones, in particular those used for the cleaning of fibre suspensions in fibre and pulp factories. More precisely the invention relates to the constructive execution of such cyclones, and in this respect a considerably improved hydrocyclone is proposed.

Hydrocyclones are known to be used to a considerable extent in the paper and pulp industry for cleaning the suspensions encountered there, more precisely aqueous suspensions of fibrous pulp, of coarse and fine impurities and particles of dirt. In view of their essentially simple construction and the absence of moving parts, these hydrocyclones have proved to be particularly suitable for their intended purpose. A very large number of cyclones is needed, however, in order to deal with and to clean the enormous flow of fibrous suspension through a normal pulp or paper factory, and their necessary large number means that the cyclones cause certain problems relating to space, handling and inspection. A rather satisfactory solution to these problems has been found recently, however; see, for example, my Swedish patent No. 83010145-4 *) and the so-called cyclone batteries described therein. One remaining problem may be said to apply to the design of the cyclone itself.

U.S. Pat. No. 4,572,787

It may be stated generally that efficiently operating hydrocyclones exhibit the common feature that they are rather long in relation to their diameter, that they have a smooth and even inside, and that their characteristic conicity lies within certain limits and is kept constant along the length of the cyclone. It cannot be claimed that it is particularly easy to manufacture such objects on an industrial scale, and there are naturally major production problems, although these have been solved by highly specialized companies in a satisfactory fashion, at least if the body of the cyclone is not excessively long.

The difficulty associated with the manufacture of conical tubular objects of considerable length often makes it necessary to divide them up into fairly short sections, which are connected together by means of flanged connections or screwed couplings. This has the effect of reducing the cost of the actual component parts of the cyclones, although the assembly work associated with the subsequent connection of these is labour-intensive and is thus increasingly costly, especially with regard to the large number of cyclones which must be screwed together for each installation.

The invention is based on the surprising discovery that it is not at all necessary to connect the sections of the cyclone together "edge-to-edge", i.e. so that the inside of one section constitutes a direct continuation of the inside of the following section, in the absence of any radial difference other than that represented by the actual conicity; the surface is thus interrupted only by the narrow gap with its gasket between the sections. In accordance with the invention, however, it has been found that the ends of the sections can overlap one another or can project one above the other to a certain extent at the joint, on condition only that the small "step" formed in this way faces in the direction of flow; i.e. the liquid circulating along the wall of the cyclone and at the same time moving down towards the tip of the cyclone must not strike the edge of a section facing in the other direction. This edge must be situated on the outside of the cyclone, so that the cyclone instead exhibits a slight increase in diameter after the joint. Tests have shown that this discontinuity in the wall of the cyclone does not have any measurable influence on the cleaning capacity of the cyclone, but permits the significant simplification of the constructive design of the cyclone, as described below.

The object of the invention is thus to make available a hydrocyclone consisting of several sections, as defined in the introduction to Patent claim 1, but executed in such a way that the manufacture and assembly of the cyclone are simplified and cheapened to a considerable degree. This object is achieved by the cyclone in accordance with the invention having been given the characteristic features indicated in Patent claim 1.

The invention is now described in greater detail, although only for illustrative purposes, with reference to the accompanying drawings, of which FIG. 1 shows in diagrammatic form the manner in which a conventional hydrocyclone divided into sections is joined together by means of a flanged joint.

FIGS. 2, 2*a* and 3 show examples of such hydrocyclones divided into sections and connected together by means of flanged joints, whereas FIGS. 4 and 4*a* show a part of a cyclone battery in which the cyclones are similarly divided up into sections, but are connected together by means of screwed couplings.

FIG. 5 shows an overall view of a long hydrocyclone divided up into sections but executed in accordance with the invention.

FIG. 5*a* shows a detailed section of FIG. 5 on an enlarged scale, and

FIG. 6 shows an end view, seen from above, of the cyclone in accordance with FIG. 5.

FIGS. 7 and 8 are respectively a side view and a plan view of a typical, so-called eccentric lock, which is suitable for use for the purposes of the invention.

Figure 9:
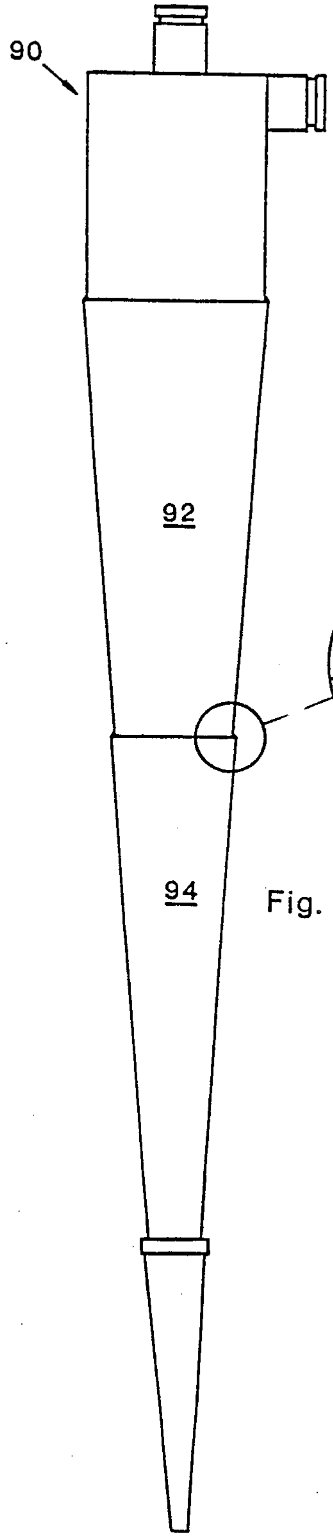
Figure 9A:
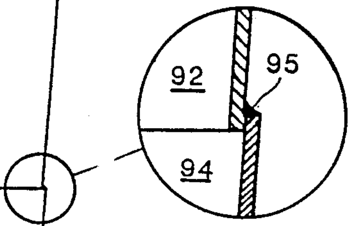
Figure 10:
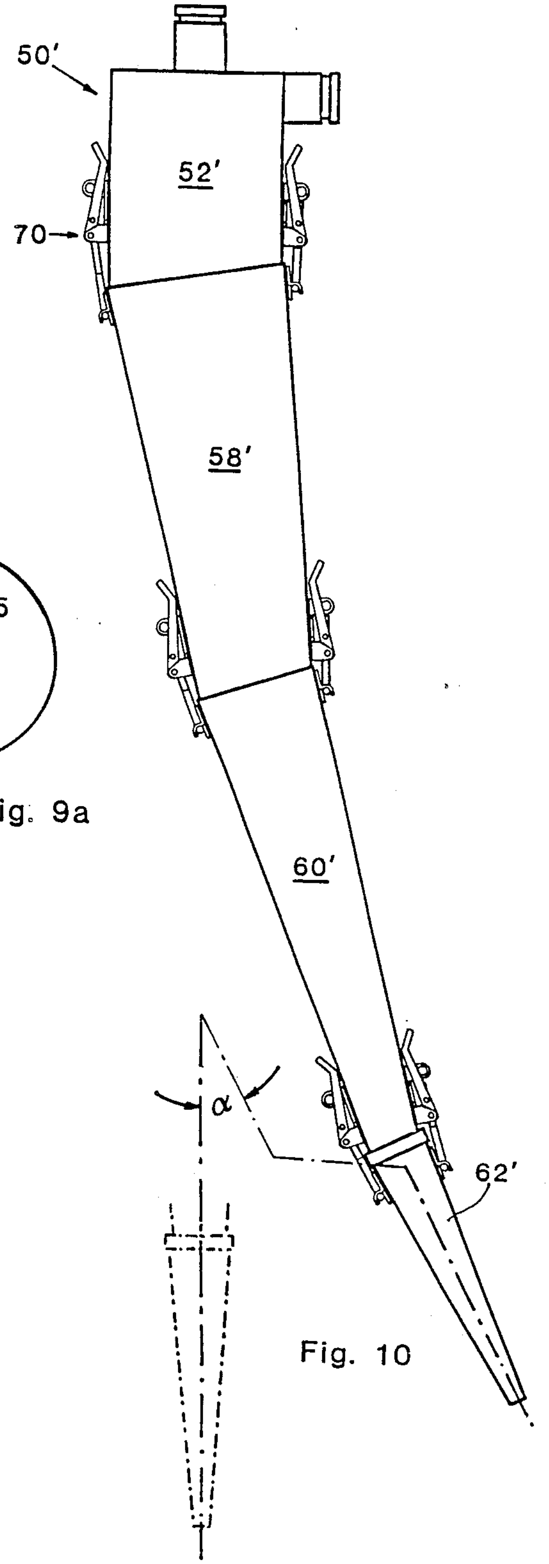

FIGS. 9, 9*a* correspond to FIGS. 5, 5*a*, and show a variant of the invention. Finally, FIG. 10 shows the cyclone in accordance with FIG. 5 with the sections joined together in another way.

Figure 1:
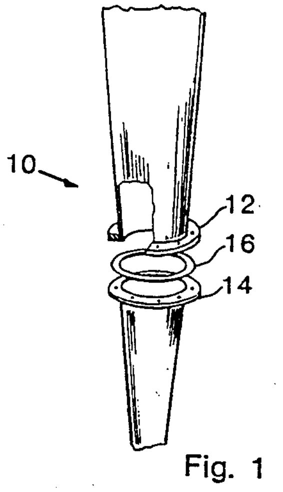

FIG. 1 thus makes clear the conventional joint between two sections of a hydrocyclone, in conjunction with which the sections are to be connected together in this case by means of a flanged joint 10, consisting of an upper flange 12 and a lower flange 14 with an interjacent gasket 16. The intention here is that the inside of the lower part of the upper section will align with the inside of the upper part of the lower section, so that the inner surface of the lower section thus constitutes a direct continuation of that of the upper section.

Figure 2:
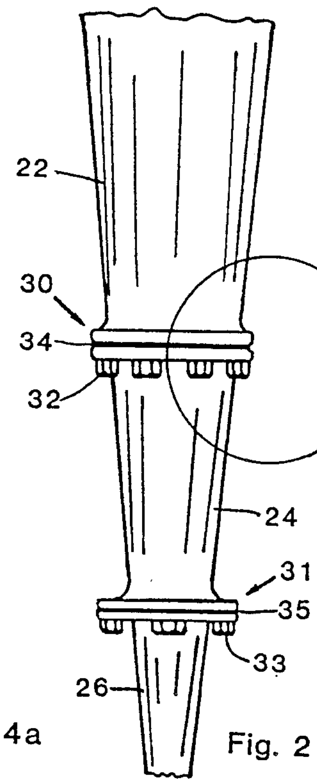
Figure 2A:
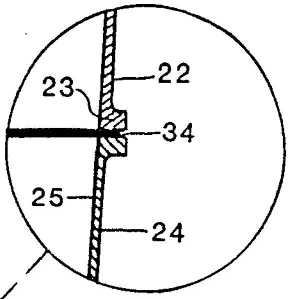

Illustrated in FIG. 2 is a part of a hydrocyclone constructed in this way and consisting of three sections, an upper section 22, a lower or tip section 26, and a middle section 24. The sections are connected together by means of upper and lower flanged joints 30 and 31, in which the flanges are drawn together by means of bolts 32 and 33, in conjunction with which an interjacent, sealing gasket 34 and 35 is compressed. As already stated above, the intention at all times, see FIG. 2*a*, is that the different sections should together form a continuous inner conical surface, and it will be appreciated that the inside 25 of the middle section 24 forms an unbroken continuation of the inside 23 of the upper section 22, in conjunction with which the surface is interrupted only by a gap which is filled by the interjacent gasket 34.

Figure 3:
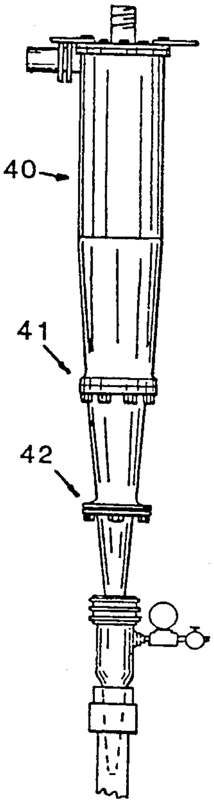

FIG. 3 shows a typical cyclone 40, executed with flanged joints 41, 42 in accordance with FIG. 2 and contained in quite a large cyclone installation. As has already been stated by way of introduction, a normally encountered cyclone cleaner installation consists of a very large number of cyclones, and the job of screwing together the flanged joints of the individual cyclones with the large number of bolts involved is exacting and time consuming work.

In order to reduce the assembly work, certain hydrocyclones which are divided up into sections are instead joined together by means of another type of screwed joint consisting of an appropriately executed clamping nut, which engages with a thread on the end of an adjacent section of the cyclone in order to tighten down in a familiar fashion a flange on the adjacent section of the cyclone with an interjacent gasket. It is clearly more expensive to execute the sections of the cyclone in this way, rather than with simple flanges, although the assembly work is simplified in return. Shown in FIG. 4 is a part of a cyclone battery in which the individual cyclones 45 are divided into sections connected together by means of screwed sleeve joints 47 and 48 of the kind already indicated.

Figure 4A:
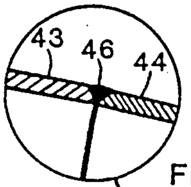
Figure 4:
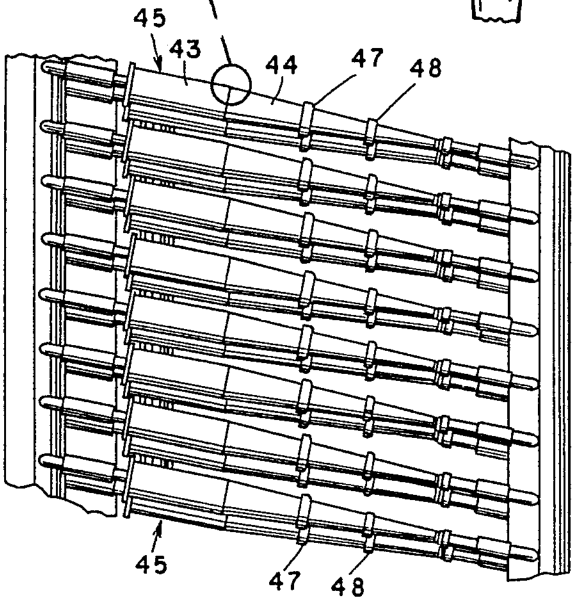

It is also necessary to mention, in the interests of completeness, that the prior art also admits the welding together of sections of the cyclone; see, for example, the detailed view in FIG. **4*a*, which shows how a cyclone 45 present in the cyclone battery in accordance with FIG. 4 may conceivably exhibit an upper, straight section 43 welded to an adjacent conical section 44. Since these sections lie edge-to-edge, they must be joined together by means of a butt weld 46, as illustrated in FIG. 4*a***. It should also be noted that the cyclone material more often than not consists of acid-resistant stainless steel of one kind or another, and that the butt welding of relatively thin sheets of such material is a highly challenging and occasionally hazardous operation, since cracking can easily occur in the welding, at least after a certain time. "Depressions" are also often formed, as are raised irregularities which must be ground down. Additionally, there is a risk of the material warping, with a lack of roundness as a consequence, so that the components must be made good by so-called calibration, or by some other means. All this after-treatment is time consuming, which is yet another reason for avoiding butt welding in hydrocyclones.

FIGS. 5 and 6 illustrate in diagrammatic form a hydrocyclone 50, which is similarly divided into sections, but with these being executed and joined together in accordance with the invention. More precisely, the cyclone consists of an upper part 52, which includes the inlet 54 of the cyclone for the fibre suspension, the inject, which is to be cleaned, and its central outlet 56 for the cleaned suspension, the accept. Connected to this upper section 52 is a first lower section 58, which in turn is followed by a second lower section 60. The cyclone is terminated at the bottom by a pointed tip section 62, through which the separated phase of the suspension, the reject, is discharged.

Unlike previously disclosed cyclones which are divided up into sections, such as those described briefly above, the cyclone described in FIGS. 5 and 6 is, as has already been stated, executed in accordance with the invention, which means that its sections are joined to one another in a surprisingly simple manner, which should be immediately apparent from the Figures. First of all, the ends of the cyclone sections project into one another for a short distance, as can be appreciated from FIG. **5*a*, in conjunction with which it should be noted that the narrower end (the narrow end) of a section, e.g. 58, engages internally in the broader end (the large end) of the adjacent section 60, i.e. the outside 63 of the narrow end engages with the inside 61 of the large end. A thin gasket 64**, for example of 'L'-shaped cross section, may be inserted appropriately between the ends of the sections.

As pointed out by way of introduction, the arrangement described above, with section ends which project over one another, has been found not to interfere with the characteristic circulating flow within the cyclone; the only condition is that the part of the circulating liquid moving towards the tip of the cyclone which flows close to the inside wall of the cyclone must not meet and strike a section edge, so that it is forced inwards and closer to the centre of the cyclone. Instead, it must flow over such an edge, so that in so doing it is caused to move outwards slightly. In other words, the sections of the cyclone must project into one another, as shown in FIG. **5*a*, i.e. the inside 59 of the small end of the cyclone section 58 must lie within the inside 61 of the large end of the cyclone section 60**. As has already been stated, tests which have been carried out have shown that there is no noticeable impairment of the cleaning capacity of the cyclones if they are joined together in the manner described.

Secondly, to return to the constructional design, thanks to the fact that the cyclone sections are so arranged as to project into one another in the manner described here, the possibility is also afforded of holding them together in an exceptionally easy manner, namely with the help of simple locking devices which are well known in the prior art, for example so-called eccentric (overcenter) locks, which are available in a variety of designs, one of which is illustrated in the drawings. In this case the various sections 52, 58, 60 and 62 of the cyclone are, as will be appreciated, connected together by means of two eccentric locks 70 arranged diametrically opposite one another at each joint. Each lock exerts its familiar drawing-in effect in conjunction with locking, and the sections are drawn rigidly and securely together in this way; it has been found that, in certain cases, when the sections are accurately executed with a good "surface finish", the gasket 64 can be omitted.

FIGS. 7 and 8 illustrate the eccentric lock 70 used in the present case in more detail. The lock concerned is a conventional variant of this type of lock, which consists of a folding lever 72 pivotally mounted on a base 74 and in turn pivotally supporting a draw-link 76. This is screwed into a pivot pin 78 mounted in the lever. At the outer end of the draw-link 76 there is a gripping device 80 in the form of a cross-piece, which engages in another part 75 of the base, which, as the lever 72 is folded, is pulled with considerable force towards the first base 74 in a previously disclosed fashion by the toggle joint action. The distance between the two parts 74 and 75 of the base is determined by external circumstances, and the effective length of the draw-link 76 is accordingly adapted by screwing the link into or out of the pin 78. It should be noted that the draw-link 76 is quite long, with a long threaded part; the available range of adjustment is consequently considerable. This is important, as will be appreciated from the following.

The base 74 is fitted with an upright locking lug 82, and the folding lever 72 can be secured in its locking position by the introduction of a locking peg or the shackle of a padlock or similar through an opening 84 in the locking lug 82.

A comparison between the cyclone in accordance with the invention, as illustrated in FIG. 5, and earlier cyclones of the same order of size, similarly divided up into sections, for example the cyclone in accordance with FIG. 3 which is assembled by means of flanged joints, shows with all possible desired clarity the far reaching simplification which has been achieved with regard both to the manufacture of the cyclone sections and to their assembly. The sections will thus consist of simple, conical shells, which only require to be provided with simple, mass produced quick action locks, for example of the type already described, whereupon the sections can be connected to one another in an instant to produce a finished cyclone. In the case of cyclones of normal size, it should be sufficient to provide two quick-action locks positioned diametrically opposite one another for each joint between the sections, although it is, of course, permissible for a greater number of locks to be arranged with equal spacing around the periphery, if required, for example in the case of cyclones of larger diameter.

In spite of the fact that the arrangement as described, involving the joining together of sections with the help of quick-action locks, is advantageous from many points of view through its simplicity and rapidity, the method described here of arranging cyclone sections with their ends inserted into one another with an "overlap" also means that what was previously such a difficult welding problem has now become much easier to manage. It has already been pointed out that the butt welding of cyclone sections edge-to-edge is problematical due, inter alia, to the sensitive grades of steel from which hydrocyclones are more often than not made and to the risk of deformation, although when the cyclone sections are arranged in the manner described above, the welding question takes on an entirely different significance.

FIG. 9 shows a hydrocyclone 90, which is identical with that shown in FIG. 5, with the exception that the sections are permanently welded together. Given that the sections are executed and arranged in accordance with the principle of the invention, and the sections can be joined together by means of fillet welds, as clearly shown in FIG. 9*a*. There is sufficient space to produce a fillet weld 95, as shown in FIG. 9*a*, because the end of the cyclone section 92 projects inwards for a short distance into the adjacent section 94, inside the top edge of the latter. It is a well known fact within the field of welding technology that a weld of this kind is produced both more easily and more safely than a butt weld, in addition to which it exhibits entirely different durability and reliability characteristics, especially in conjunction with the demanding materials with which we are concerned here.

As a final illustrative example of the application of the invention, FIG. 10 shows a hydrocyclone 50' which corresponds essentially to the cyclone 50 in accordance with FIG. 5, in which the various sections are connected together by means of quick-action locks. In accordance with FIG. 10, however, the sections 52', 58', 60' and 62' are not joined together coaxially, but from one section to the next their centre lines form a slight angle to one another, with the result that the cyclone as a whole has a "curved" appearance, as shown in FIG. 10. This is easily achieved thanks to the construction of the quick-action lock; as pointed out in conjunction with their description with reference to FIGS. 7 and 8, the locks are adjustable over a considerable range, so that they can be made to "tighten" to a greater extent on one side of the cyclone than on the other. In total, the tip section 62' can be made to deviate through an angle $\alpha$ (see FIG. 10) from its original direction. Curving of the cyclone in this way has not been shown to have any noticeably negative effect on the cleaning capacity of the cyclone, and the moderate variation in angle from one section to another with which we are concerned here does not constitute any problem for the seal between the sections. The possibility of bending the cyclone in this way is able in many cases to facilitate to a considerable degree the erection of frames and connecting pipework systems. In this case, too, of course, the sections can be welded together permanently.

In conclusion, it must be said that the invention is not, of course, restricted to the embodiment of the cyclone illustrated and described here, and especially not to the special type of eccentric lock described. Other, previously disclosed types of quick-action lock can also be used; the only requirement is that their effect should not be restricted to a simple locking function, that is to say they must not simply hold the sections together, but they must also, in line with the precise characteristics of the eccentric lock, exert an application force at the moment of locking, such that the sections are drawn into rigid engagement with one another.

I claim:

1. Hydrocyclone, suitable for the cleaning of fibre suspensions in pulp and paper factories, comprising an elongated conical housing comprising a number of sections of truncated conical form, which are connected to one another, the interior of which housing defines a conically tapering cyclone chamber into which is to flow the suspension to be cleaned along the inside of the housing from the widest part to the narrowest part of the chamber whilst rapidly circulating, wherein at least two of the truncated conical sections of the housing are situated one next to the other and are so dimensioned that the truncated conical lower end portion of one of the two sections projects for a small distance in the direction of flow into the adjacent truncated conical upper end portion of the other section in the direction of flow, so as to form a joint in which the outside of the inward-projecting truncated conical lower end portion of the one section snugly radially opposes the inside of the truncated conical upper end portion of the other section in nested relation therewith, means actuable to a locked condition for (1) preventing separation of the two sections and (2) exerting a continuing force lengthwise of the two sections pulling the two sections into rigidly jammed nesting engagement, such means comprising at least two quick-action locks distributed circumferentially equally around the joint between the two sections, the two sections being releasably fixed together by said locks, said locks being actuable to pull the two sections forcibly together.

2. Hydrocyclone according to claim 1, in which a sealing gasket is located radially between said outside and inside, respectively, of the two sections.

3. Hydrocyclone according to claim 1, in which the locks are overcenter toggle locks of an adjustable type having engagement devices adjustably displaceable by different amounts outwards from an operating part of the lock.

4. Hydrocyclone according to claim 3, in which said first and second parts are respective bases fixed on the outsides of said two truncated conical sections adjacent said joint, said connecting means of a given said lock comprising a lever pivoted at one end on one said base and having a free end swingable from a locked position adjacent said one base to an unlocked position adjacent the other base, a pivot member on said lever and spaced between said ends of said lever, a threaded draw-link having one end removably pivoted on said other base, said threaded draw-link threadedly engaging said pivot member and being threadedly adjustable with respect to said pivot member to change the effective length of the portion of the draw-link between said one draw-link end and said pivot member and to thereby change the locked length of the lock.

5. Hydrocyclone according to claim 1, in which the sections are connected together in such a way that the centre-lines of at least said two adjacent sections form an angle with one another, such that the cyclone as a whole exhibits curved form, with at least one section pivoted to the side through an angle from coaxial relation to the rest of the cyclone, each lock having a first part fixed on said one truncated conical section and a second part fixed on said other truncated conical section and means connecting said first and second parts and actuable for forcibly pulling same closer together lengthwise of said sections, said two locks having their respective means connecting the respective first and second parts thereof adjustable to different locked lengths so as to jam the two truncated conical sections in a noncoaxial, relatively locked relation.

* * * * *